3,793,301
SURFACE-COATING COMPOSITIONS CONTAINING ORGANOTIN-IMIDE FUNGICIDES

Pasquale P. Minieri, Woodside, N.Y., assignor to Tenneco Chemicals, Inc., Saddle Brook, N.Y.
No Drawing. Continuation of application Ser. No. 766,982, Oct. 11, 1968, now Patent No. 3,544,588. This application Apr. 2, 1970, Ser. No. 25,303
Int. Cl. C08f 45/64; C09d 5/14
U.S. Cl. 260—45.75 K   6 Claims

ABSTRACT OF THE DISCLOSURE

Organotin imides that have the structural formula

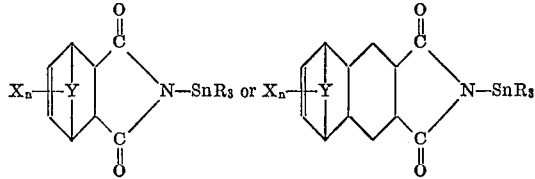

wherein each R represents phenyl or an alkyl group having from 4 to 8 carbon atoms, X represents an alkyl group having from 1 to 4 carbon atoms, an alkenyl group having from 4 to 8 carbon atoms, halogen, or phenyl; Y represents methylene, ethylene, chloromethylene, or chloroethylene; and $n$ represents an integer in the range of 0 to 4 can be used to protect surface-coating compositions from deterioration resulting from attack by fungi and other microorganisms.

---

This application is a continuation-in-part of my copending application Ser. No. 766,982, which was filed on Oct. 11, 1968 which is now U.S. Pat. No. 3,544,588.

This invention relates to surface-coating compositions. More particularly, it relates to surface-coating compositions containing organotin imides that have improved resistance to deterioration resulting from attack by fungi and other microorganisms.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi. Others, for example, aqueous dispersions of water-insoluble synthetic linear polymers, generally contain as plasticizers and as thickeners materials that have their origin in animal or vegetable sources and that render the compositions susceptible to mildew. The resulting deterioration of the surface-coating compositions seriously hinders their full scale utilization, particularly in those areas and in those applictaions that are conducive to such attack. Various biocidal materials have been suggested for use in surface-coating compositions, but none has proven entirely satisfactory in their application. Some do not provide the required prolonged protection against attack by microorganisms, while others undergo sulfide staining, and still others tend to separate from the applied coating by migration, volatilization, or leaching once the coating has been spread in a thin layer over the surface to be protected.

This invention relates to surface-coating compositions that contain a new class of biocides. These biocides, which are thoroughly compatible with the resinous binders that are commonly used in surface-coating compositions and which are resistant to sulfide staining, provide excellent and prolonged resistance to deterioration resulting from attack by fungi, bacteria, and other microorganisms without adversely affecting the color, viscosity, and other physical properties of the surface-coating compositions.

The biocidal compounds that are used in the surface-coating compositions may be represented by the structural formula

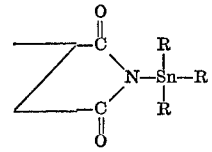

wherein each R represents phenyl or an alkyl group having from 4 to 8 carbon atoms; Z represents a divalent cyclic group having the structure

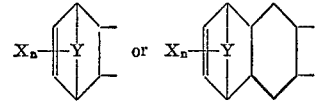

X represents an alkyl group having from 1 to 4 carbon atoms, an alkenyl group having from 4 to 8 carbon atoms, halogen, or phenyl; Y represents methylene, ethylene, chloromethylene, or chloroethylene; and $n$ represents an integer in the range of zero to four. Illustrative of these compounds are the following:

N-tri-n-butyltin 1,4-endomethylene-dihydro-2,3-phthalimide,
N-tri-n-butyltin 1,4,5,6,7,7-hexachloro-1,4-endomethylene-dihydro-2,3-phthalimide (chlorendic imide),
N-trihexyltin 1,4,5,6,7,7-hexachloro-1,4-endomethylene-dihydro-2,3-phthalimide (chlorendic imide),
N-tri-n-octyltin 3-methyl-6-isopropyl-3,6-endoethylene-dihydro-2,3-phthalimide,
N-triphenyltin 5,6,7,8,9,9-hexachloro-5,8-endomethylene-octahydro-2,3-naphthalimide (chlorocyclic imide),
N-tri-n-butyltin 5,6,7,8-tetramethyl-5,8-endoethylene-octahydro-2,3-naphthalimide,
trihexyltin 5,6,7,8-tetraphenyl-5,8-endomethylene-octahydro-2,3-napthalimide, and the like. A single organotin imide or a mixture of two or more of these compounds may be present in the compositions of this invention.

The organotin imides may be prepared by any suitable and convenient procedure. For example, they may be prepared by the reaction of the appropriate dicarboxylic acid imide with a trialkyl or triaryl tin oxide or hydroxide. The imides are readily prepared by bubbling anhydrous ammonia through a solution of a dicarboxylic acid anhydride. The dicarboxylic acid anhydrides that can be used as the starting materials in the preparation of the fungicidal compounds include those obtained by the condensation of maleic anhydride with a diene, such as 1,3-hexadiene, 2,4-hexadiene, isoprene, 1,1,3-trimethylbutadiene, allo-ocimene, and the like as well as those obtained by the reaction of tetrahydrophthalic anhydride or a substituted tetrahydrophthalic anhydride with a polyhalocyclopentadiene.

The organotin imides of this invention can be used to impart fungal and bacterial resistance to a wide variety of surface-coating compositions including both organic solvent-based and water-based coating systems. They are particularly valuable as biocides in coatings that contain as their resinous binder either an oleoresinous material or a water-insoluble synthetic linear addition polymer.

In a preferred embodiment of the invention, an organotin imide is used as the biocide in an organic solvent-based system that contains an oleoresinous binder. Suitable oleoresinous binders include drying oils, such as linseed oil, tung oil, soybean oil, dehydrated castor oil, safflower oil, or fish oil; bodied drying oils; blends of drying oils or bodied drying oils with a resin component, such as limed rosin, an ester gum, or a phenolic resin; oleoresinous varnishes formed by heating one of the aforementioned resins with one or more drying oils or bodied drying oils; and alkyd resins, which are resinous products resulting from the reaction of a polyhydric alcohol such as pentaerythritol or glycerol, with a dicarboxylic acid, such as phthalic anhydride, and fatty acids.

In another preferred embodiment of the invention, the organotin imides are used in aqueous dispersions that contain about 10 percent to 60 percent by weight of a water-insoluble resinous binder that is an oleoresinous binder as hereinbefore defined and/or a synthetic linear addition binder. The aqueous dispersions of synthetic linear addition polymers are ordinarily prepared by the emulsion polymerization of ethylenically unsaturated compounds, especially those of monoethylenically unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with vinyl chloride; copolymers of vinyl acetate with acrylonitrile; copolymers of vinyl chloride with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

Only a small concentration of the organotin compound need be present in the surface-coating compositions of the present invention. It has been found that as little as 0.10 percent of one or more of these compounds, based on the weight of the composition, will bring about an appreciable improvement in the resistance of the composition to attack by microorganisms. Three percent or more of the biocidal compounds can be used, but these larger amounts generally do not provide further improvement in the properties of the surface-coating compositions and for this reason are not ordinarily used. While the amount of the biocidal compound that will provide optimum protection for a surface-coating composition depends upon such factors as the choice of biocidal compound, the choice of resinous binder and other components of the surface-coating composition and the amount of each that is used, and the application for which the coating composition is intended, in most cases about 1 percent to 2 percent of the organotin compound, based on the weight of the surface-coating composition, is used.

In addition to the resinous binder and the organotin compound, the surface-coating compositions of the present invention may contain various auxiliary materials, such as pigments, extenders, solvents, dyes, defoaming agents, driers, emulsifiers, dispersing agents, plasticizers, bactericides, and corrosion inhibitors, in the amounts ordinarily used for these purposes.

The organotin imide that is used as the biocide may be incorporated into the surface-coating composition by any convenient procdure. For example, it can be combined with the pigments and other components to form a pigment phase that is then mixed with the resinous binder and water or organic solvent to form the surface-coating composition. Alternatively, it can be added to a composition that contains the resinous binder, pigment, and water or organic solvent. The organotin compound can be added as such to the other components of the surface-coating composition, or it can be added as a solution of the organotin compound in, for example, an alcohol, ether, or ketone.

The invention is further illustrated by the examples that follow.

EXAMPLE 1

(A) Anhydrous ammonia was bubbled through a solution of 139.2 grams of chlorendic anhydride (1,4,5,6,7,7-hexachloro-1,4-enedomethyl - dihydro-2,3-phthalic anhydride) in 450 ml. of toluene which was maintained at 80° to 105° C. until the absorption of ammonia had ceased. During this absorption step, which required 2.75 hours, 7.1 grams of ammonia was absorbed.

The reaction mixture was heated at its reflux temperature for a few minutes and then cooled to room temperature. After standing overnight, the reaction mixture was cooled in an ice bath and then filtered. The solid product was washed with cold toluene and dried at 100° C./1 mm. After recrystallization from 450 ml. of a 9:1 water-alcohol mixture, there was obtained 124.2 grams of chlorendic imide, which melted at 277°–279° C. (literature, 280° C.).

(B) A mixture of 37 grams (0.1 mole) of chlorendic imide, 29.8 grams (0.05 mole) of tri-n-butyltin oxide, and 300 ml. of benzene was heated at its reflux temperature with stirring for one hour, during which time 0.95 ml. of water was collected in the Dean-Stark trap. After cooling, the solvent was removed by heating the reaction mixture at 60° C./1 mm.. There was obtained 64.6 grams of N-tri-n-butyltin chlorendic imide, which melted at 97°–114° C. and which contained 17.95% Sn (calculated, 18.1% Sn).

EXAMPLE 2

A mixture of 18.5 grams (0.05 mole) of chlorendic imide, 18.4 grams (0.05 mole) of triphenyltin hydroxide, and 150 ml. of toluene was heated at its reflux temperature with stirring for 1.5 hours. The reaction mixture was cooled to room temperature, allowed to stand overnight, and filtered. After washing with toluene and drying, there was obtained 24.7 grams of N-triphenyltin chlorendic imide, which melted at 206°–207.5° C. and which contained 16.83% Sn and 28.5% Cl (calculated, 16.51% Sn and 29.59% Cl.).

EXAMPLE 3

(A) Anhydrous ammonia was bubbled through a solution of 106.8 grams of chlorocyclic anhydride (5,6,7,8,9,9-hexachloro - 5,8 - endomethylene - octahydro-2,3-naphthalic anhydride) in 300 ml. of toluene which was maintained at 85° to 100° C. until the absorption of ammonia had ceased. During the absorption step, which required 1.75 hours, 4.6 grams of ammonia was absorbed.

The reaction mixture was allowed to stand overnight at room temperature. It was then diluted with toluene, cooled in an ice bath, and filtered. The solid product was washed with toluene and dried at 60° C./1 mm. There was obtained 93.5 grams of chlorocyclic imide.

(B) A mixture of 42.4 grams (0.1 mole) of chlorocyclic imide, 29.8 grams (0.05 mole) of tri-n-butyltin oxide, and 300 ml. of benzene was heated at its reflux temperature for one hour, during which time 0.855 ml. of water was collected in the Dean-Stark trap. The reaction mixture was cooled, and the solvent was removed under reduced pressure. There was obtained 70.5 grams of N-tri-n-butyltin chlorocyclic imide, which contained 41.3% C, 5.02% H, and 28.6% Cl (calculated, 42.2% C, 4.95% H, and 29.9% Cl).

EXAMPLE 4

A mixture of 21.3 grams (0.05 mole) of chlorocyclic imide, 18.4 grams (0.05 mole) of triphenyltin hydroxide, and 150 ml. of toluene was heated at its reflux temperature with stirring for 1.5 hours, during which time 0.9 ml. of water was collected in the Dean-Stark trap. The reaction mixture was cooled to room temperature, allowed to stand overnight at room temperature, cooled in an ice bath, and filtered. There was obtained 38.3 grams of triphenyltin chlorocyclic imide, which contained 47.5% C, 3.71% H, 2.55% N, 26.7% Cl, and 15.4% Sn (calculated, 48.2% C, 2.98% H, 1.82% N, 27.6% Cl, and 15.4% Sn.

EXAMPLE 5

A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% aqueous solution of methylcellulose | 200 |
| Diethyl ether of diethylene glycol | 37 |
| Aqueous solution containing 55% by weight of polyvinyl acetate | 350 |

To samples of this paint were added the amounts of N-tri-n-butyltin chlorendic imide indicated in Table I. For compartive purposes, samples were prepared that contained phenylmercuric acetate as the fungicide.

The following standard testing procedure was used: Pieces of drawdown paper were dipped into each of the treated paints, dried for 24 hours, and again dipped into the paint. The coated paper samples were cut into 1¼″ squares. Each of the coated paper squares thus prepared was placed on a plate of malt and mycophil agar, which had previously been inoculated with 1 ml. of a suspension of the test organism. The plates, prepared in triplicate, were incubated at 28° C. and observed weekly. The growth was estimated according to the following key, and the results of the replicate plates were averaged:

ZO=Zone of inhibition in mm.
0=No zone of inhibition
__=Sample not tested

The results obtained are summarized in Table I.

EXAMPLE 6

To samples of the polyvinyl acetate emulsion paint whose preparation was described in Example 5 and an acrylic emulsion paint were added 2% by weight of a fungicide. Pieces of drawdown paper were dipped into each of the treated paints, dried for 24 hours, and again dipped into the paint. After a 24 hour drying period, one of the samples coated with each of the treated paints was leached for 24 hours in accordance with Method 5831, CCC-T-1916. The coated paper samples were cut into 1¼″ squares, which were evaluated by the procedure described in Example 5.

The acrylic paint that was used in this test was prepared by mixing together the following materials:

| | Parts by weight |
|---|---|
| Water | 250 |
| Acrylic acid resin (100% solids) (Acryloid B-66) | 385 |
| Monoethyl ether of ethylene glycol | 259 |
| Titanium dioxide | 143 |
| Aluminum silicate | 45 |
| Magnesium silicate | 98 |

The results obtained are summarized in Table II. In this table

ZO=Zone of inhibition in mm.
0=No zone of inhibition, no growth on paint film
1-9=Increasing amounts of growth on paint film
10=Paint film completely covered by growth
*=Weeks of incubation at 28° C. and 90% Relative Humidity

TABLE II

| | N-tri-n-butyltin chlorendic imide | Phenyl- mercuric acetate | None |
|---|---|---|---|
| Acrylic paint: | | | |
| Effect on color of— | | | |
| Liquid paint | None | None | |
| Paint film | do | do | |
| pH | 9.3 | 9.4 | 9.5 |
| Fungicidal activity: | | | |
| *A. niger:* | | | |
| Unleached: | | | |
| 1 week* | 0 | ZO-8 | 10 |
| 2 weeks | 0 | ZO-8 | 10 |
| 4 weeks | 0 | ZO-7 | 10 |
| Leached: | | | |
| 1 week* | 0 | ZO-7 | 10 |
| 2 weeks | 0 | ZO-7 | 10 |
| 4 weeks | 0 | ZO-7 | 10 |
| *P. pullulans:* | | | |
| Unleached: | | | |
| 1 week* | 0 | 0 | 10 |
| 2 weeks | 0 | 0 | 10 |
| 4 weeks | 2 | 0 | 10 |
| Leached: | | | |
| 1 week* | 0 | 0 | 10 |
| 2 weeks | 0 | 0 | 10 |
| 4 weeks | 1 | 1 | 10 |
| Yellowness index: | | | |
| Initial | 0.8 | 1.4 | 0.4 |
| 4 weeks | 1.3 | 1.2 | 0.7 |

TABLE I

| | Fungicide | | | | | | | | |
|---|---|---|---|---|---|---|---|---|---|
| | N-tri-n-butyltin chlorendic imide | | | | Phenylmercuric acetate | | | | |
| Percent fungicide | 0.1% | 0.5% | 1% | 2% | 0.1% | 0.5% | 1% | 2% | None |
| Effect on color of paint | None | None | None | None | None | None | None | None | None |
| Fungicidal activity: | | | | | | | | | |
| *Pullularia pullulans* | ZO-1 | ZO-3 | ZO-3 | ZO-4 | ZO-5 | ZO-10 | ZO-14 | ZO-16 | 0 |
| *Penicillum crustosum* | ZO-1 | ZO-2 | ZO-2 | ZO-3 | ZO-3 | ZO-6 | ZO-9 | ZO-12 | 0 |
| *Aspergillus niger* | 0 | ZO-2 | ZO-3 | ZO-2 | ZO-12 | ZO-16 | ZO-16 | ZO-20 | 0 |
| Baceterial activity: | | | | | | | | | |
| *Bacillus subtilis* | | | ZO-4 | ZO-5 | | | ZO-10 | ZO-10 | 0 |
| *Pseudomonas aeruginosa* | | | ZO-1 | ZO-2 | | | ZO-8 | ZO-10 | 0 |

TABLE II—Continued

| | N-tri-n-butyltin chlorendic imide | Phenyl-mercuric acetate | None |
|---|---|---|---|
| Polyvinyl acetate paint: | | | |
| Effect on color of— | | | |
| Liquid paint | None | None | None |
| Paint film | do | do | None |
| pH | 7.6 | 7.0 | 7.2 |
| Fungicidal activity: | | | |
| *A. niger:* | | | |
| Unleached: | | | |
| 1 week* | ZO-5 | ZO-13 | 10 |
| 2 weeks | ZO-5 | ZO-8 | 10 |
| 4 weeks | ZO-5 | ZO-8 | 10 |
| Leached: | | | |
| 1 week* | ZO-5 | ZO-9 | 10 |
| 2 weeks | ZO-5 | ZO-6 | 10 |
| 4 weeks | ZO-3 | ZO-6 | 10 |
| *P. pullulans:* | | | |
| Unleached: | | | |
| 1 week* | ZO-1 | 0 | 10 |
| 2 weeks | ZO-1 | 0 | 10 |
| 4 weeks | ZO-1 | 0 | 10 |
| Leached: | | | |
| 1 week* | ZO-2 | 0 | 10 |
| 2 weeks | ZO-1 | 0 | 10 |
| 4 weeks | ZO-1 | 0 | 10 |
| Yellowness index: | | | |
| Initial | 2.1 | 1.3 | 1.6 |
| 4 weeks | 2.1 | 1.5 | 2.0 |

From the data in Tables I and II, it will be seen that N-tri-n-butyltin chlorendic imide is an effective biocide for paints, and particularly for such water-based paints as polyvinyl acetate paints and acrylic paints. It imparted to these paints excellent resistance to attack by fungi and bacteria which was maintained even after leaching. In addition this organotin imide did not affect the color or the pH of the paints. Unlike those containing phenyl-mercuric acetate, the paint films containing N-tri-n-butyl-tin chlorendic imide did not undergo any black or gray staining when they were exposed to hydrogen sulfide.

Each of the other organotin imides disclosed also has biocidal properties that make it useful in many industrial and agricultural applications.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A surface-coating composition having improved resistance to attack by fungi and other microorganisms that comprises (1) a water-insoluble resinous binder selected from the group consisting of oleoresinous binders, synthetic linear addition polymers obtained by the vinyl polymerization of monoethylenically unsaturated molecules, and mixtures thereof, and (2) about 0.10% to 3.0%, based on the weight of said composition, of a fungicidal compound having the structural formula

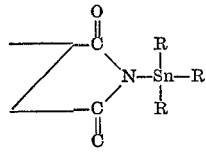

wherein each R represents a member selected from the group consisting of phenyl and alkyl groups having from 4 to 8 carbon atoms; Z represents a divalent cyclic group selected from the group consisting of

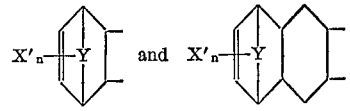

X' represents halogen; Y represents a member selected from the group consisting of methylene, ethylene, dichloromethylene and dichloroethylene; and *n* represents an integer in the range of one to four.

2. A surface-coating composition according to claim 1 that contains 1% to 2.0%, based on the weight of the composition, of said fungicidal compound.

3. A surface-coating composition according to claim 1 wherein the fungicidal compound is N-tri-n-butyltin 1,4,5,6,7,7 - hexachloro-1,4-endo-methylene-dihydro-2,3-phthalimide.

4. A surface-coating composition according to claim 1 wherein the fungicidal compound is N-tri-n-butyltin 5,6,7,8,9,9 - hexachloro - 5,8-endo-methylene-octahydro-2,3-naphthalimide.

5. A surface-coating composition according to claim 1 wherein the resinous binder is polyvinyl acetate.

6. A surface-coating composition according to claim 1 wherein the resinous binder is an acrylic acid resin.

References Cited

UNITED STATES PATENTS

| | | | |
|---|---|---|---|
| 3,340,273 | 9/1967 | Hayes | 424—274 |
| 2,640,006 | 5/1953 | Ligett et al. | 424—245 |
| 3,297,523 | 1/1967 | Frensch et al. | 424—288 |
| 2,863,801 | 12/1958 | Kuhle et al. | 424—274 |
| 3,097,999 | 7/1963 | Koopmans | 424—245 |
| 3,288,813 | 11/1966 | Kleiman | 424—288 |
| 3,334,119 | 8/1967 | Cohen | 424—288 |
| 3,214,453 | 10/1965 | Stern | 424—288 |
| 3,308,082 | 3/1967 | Pauli et al. | 424—78 |

FOREIGN PATENTS

| | | | |
|---|---|---|---|
| 1,053,043 | 9/1953 | France | 424—245 |

HOSEA E. TAYLOR, Primary Examiner

V. P. HOKE, Assistant Examiner

U.S. Cl. X.R.

106—15 AF